Patented June 6, 1950

2,510,522

UNITED STATES PATENT OFFICE 2,510,522

TEXTILE TREATING PRODUCTS AND PROCESS OF MAKING

John B. Rust, Montclair, N. J., assignor, by direct and mesne assignments, of one-half to Montclair Research Corporation, a corporation of New Jersey, and one-half to Ellis-Foster Company, Montclair, N. J., a corporation of New Jersey No Drawing. Application December 9, 1944, Serial No. 567,529

10 Claims. (Cl. 260—295)

The present invention relates to chemical reaction products capable of application to textiles to render them water repellent. An object of the invention is to produce high molecular weight water soluble reaction products from a fatty amide and an alkoxymethyl derivative of an amidogen compound. These products may be formed by heating together a fatty acid amide containing a carbon chain of more than 9 carbon atoms with an alkoxymethyl melamine, urea, dicyanodiamide, guanidine and the like, to produce a high molecular weight waxy reaction product. This reaction product, which has enhanced hydrophobic characteristics, is then reacted with an inorganic halogen-containing reagent and a tertiary amine.

It is an object of this invention to provide water repellent chemicals which impart a greater degree of permanency to a hydrophobed fabric. It is a further object of this invention to produce quaternary ammonium compounds which when applied to textiles and baked give, besides a reaction product with the cellulose in the textile or the protein matter, insolubilization by the formation of a high molecular weight modified amidogen resin.

Further objects and advantages of the present invention are given hereinafter in the more detailed description and explanation, it being understood that this more detailed description and explanation is given by way of illustration only and should not be construed as limiting, since numerous variations may be made by those skilled in the art without departing from the spirit and scope of the present invention.

I have found that when a fatty acid amide such as stearamide, palmitamide, lauramide and the amides of fatty acids having a carbon chain of 20, 22, 24 carbon atoms and so forth, is heated with sufficient alkoxy methyl amidogen compound such as hexaethoxymethyl melamine, a progressive increase in viscosity is obtained and finally the entire mass sets up to a gel. The fatty acid amide is chemically bound in the gel and cannot be extracted. However, if this reaction is interrupted short of the gel stage and the reaction product reacted further with a halogen containing substance such as hydrogen chloride, hydrogen bromide, phosphorus trichloride, phosphorus oxychloride, phosphorus pentachloride, thionyl chloride, sulfuryl chloride and the like, in the presence or absence of formaldehyde, and then this reaction product is heated with a tertiary amine such as pyridine, picoline, quinoline, triethyl amine and the like, a hard, waxy material which is readily dispersible in water results.

Or the fatty acid amide material which is reacted with the alkoxy methyl amidogen compound may be directly combined with such addition products as pyridine hydrochloride, picoline hydrochloride, or the complexes resulting from the reaction of other inorganic halogen-containing acidic bodies such as phosphorus trichloride, phosphorus oxychloride, phosphorus pentachloride, thionyl chloride, sulfuryl chloride and the like, with a tertiary amine such as pyridine, picoline, quinoline, triethyl amine and the like. In this way there are directly produced waxy materials which are entirely dispersible in water. In order to allow the materials of the present invention to be more easily handled, I usually prefer to make them into a paste with some relatively inert solvent, such as a petroleum fraction known to the trade as "Varsol," dioxan, ethyl alcohol, isopropyl alcohol, butyl alcohol and the like, or ethyl acetate, isopropyl acetate and the like. These pasty materials are readily emulsifiable with water and their water suspension imparts an excellent water repellent characteristic to the fiber.

The products of this invention may be represented by the general formula

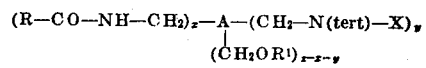

where A represents an aldehyde-reactable polyfunctional amidogen compound minus the aldehyde-reactive N-hydrogens thereof, said compound being a nitrogenous compound having a plurality of nitrogen atoms with aldehyde-reactive N-hydrogens thereon such as urea, thiourea, dicyandiamide, guanidine, melamine and the like; R—CO is the acyl radical of a fatty acid containing more than 9 carbon atoms; $R^1$ is a lower alkyl group (e. g., less than about 5); N (tert) is a tertiary amine; X is a halogen-containing anion; $z$ is a positive integer equal to the number of aldehyde-reactive N-hydrogen atoms in the amidogen compound and $x$ and $y$ are positive integers at least 1, and whose sum is not more than $z$. If A is the residue of melamine or urea, it may be represented by (C₃N₆) and (CON₂), respectively, and the sum of $x$ and $y$ is not more than 6 and 4, respectively. An illustrative product from an alkoxymethyl melamine, stearamide and pyridine hydrochloride, wherein all the alkoxy groups are replaced has the formula:

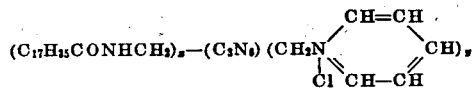

and an analogous compound from urea:

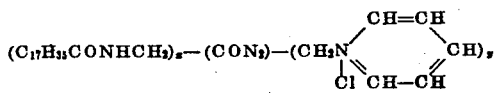

Thus, the products comprise polyalkoxymethyl derivatives of a polyfunctional amidogen compound, wherein at least one alkoxy group is replaced by an acylamido group from the fatty acid amide and at least one alkoxy group is replaced by a quaternary ammonium group from the reaction with the tertiary amine and the halogen compound, each replacing group being linked to a methyl carbon by way of a nitrogen atom.

When such reaction products containing a polyfunctional amidogen component, a long-chain amide group and a quaternary ammonium group are heated on a textile fabric, the quaternary nitrogen group is eliminated and the remainder of the molecule combines with and is anchored to the textile fiber, presumably by reaction therewith. Heating also causes further condensation of the amidogen residue whereby insolubilization occurs. The result of heating the compound on the textile is, therefore, the development on the fiber of a hydrophobic compound whereby a water-repellent effect is obtained which is substantially unchanged when the fabric is treated with non-aqueous solvents such as drycleaning fluids. Water repellents heretofore used have not been as stable to drycleaning as might be desired.

The products are formed by preparing an alkoxymethyl derivative of the amidogen compound and reacting a solution of this in steps or simultaneously with, on the one hand, a long chain fatty acid amide as above indicated and, on the other hand, a tertiary amine and an inorganic halogen containing compound, the latter treatment being stepwise as by reaction with a tertiary amine followed by an inorganic halogen-containing compound, or simultaneously by adding the amine and halogen compound together. An advantageous method is to heat the solution of the alkoxymethyl amidogen compound with the acid amide until the amide is combined and to interrupt the reaction before an insoluble product is obtained. It is desired to retain as many methylene groups attached to the amidogen nucleus and the amido nitrogen as possible, in order to obtain complete subsequent cure or insolubilization of the compound on the fabric. Therefore, after the amide has been combined it is preferable to add a small amount extra of anhydrous formaldehyde, as in the form of paraform, to the reaction mixture. Thereafter the tertiary amine is combined in quaternary ammonium combination as indicated.

Alkoxymethyl amidogen compounds include the reaction products of formaldehyde-amidogen compounds with alcohols. For example, a methylolmelamine such as hexamethylolmelamine is heated with an alcohol such as ethanol and the water of reaction removed. In reaction with the fatty acid amide, the alkoxy group splits off as an alcohol; hence the alkoxy group should be that from an alcohol readily volatile at a moderate temperature such as methyl, ethyl, propyl, isopropyl, butyl, allyl or amyl alcohol. Alkoxymethyl amidogen compounds may be generally represented by the formula $A-(CH_2OR^1)_z$ where A is the amidogen nucleus, $R^1$ is the radical of said alcohol containing no more than 5 carbons and $z$ is an integer more than 1 and not more than the number of replaceable hydrogens of the amidogen compound. After the amide has been reacted additional solvent may be added so that the product, after the final step, is in the form of a soft wax or paste. In this form it is more easily dispersed in water than when the final product contains no solvent and is of a hard waxy nature.

Although I do not wish to be limited by any possible theoretical explanation of the process of the present invention, it is thought that the following formulas illustrate what may be taking place in the reactions when melamine is the amidogen compound. I have illustrated only two possibilities out of many which may occur. These possibilities are considered to be representative of the general reactions of the present invention:

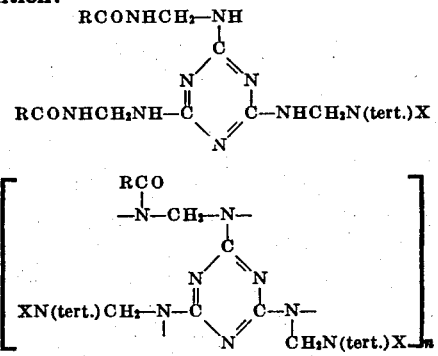

In the above formulas RCO—, N (tert.) and X have the significance noted above and $n$ is a number representing the degree of resinification through crosslinking of the indicated free bonds of the amidogen (melamine) and the amido group residue, which free bonds may link the amido groups and the amidogen residue intermolecularly or intramolecularly by way of CH₂ groups in ways too numerous to indicate. Also the indicated free bonds may represent points of attachment to alkoxymethyl groups. The value of $n$ is greater after the compound has been cured on the textile than before.

Such reaction products may be applied to textiles such as cotton, linen, rayon, acetate, aralac, wool, silk, nylon and the like and thereafter baked at an elevated temperature. An excellent water repellency is conferred upon the fabric and the repellency is more permanent than from an unmodified fatty acid amide water repellent material. By carrying out this process the product becomes fixed upon the fabric to such an extent that it is fast to washing and dry cleaning. Furthermore the tensile strength of the fabric is not sensibly decreased.

The fabric so treated cannot be described as water-proof since it will readily wet out in warm or cold water containing a wetting agent. However, when the fabric is dry it strongly repels water impinging on its surface.

It has been found that a 1%–10% solution of the water soluble reaction products of the present invention is satisfactory for impregnating purposes. After squeezing out the excess of impregnating solution, the fabric is dried at for instance about 60° C. for 15-20 minutes or at 100-110° C. for 1-2 minutes in a current of air. By this treatment the fabric is thoroughly dried. It is then heated to a higher temperature of for instance 140-145° C. for about 15 minutes or at 160-165° C. for from 2 to 5 minutes or even at 170° C. for one minute. This latter treatment fixes the fatty acid amide alkoxymethyl amidogen product on the fabric rendering it insoluble in water and organic solvents. The fabric is then soaped out in a mild bath in order to remove any entrained salts or soluble organic compounds.

Besides the active ingredients of the water repellents of the present invention, I may also use mixtures of the active ingredients with waxes or metallic soaps such as candelilla wax, montan wax, carnauba wax and the like, and aluminum stearate, zinc stearate, barium stearate, aluminum palmitate, strontium stearate, cerium stearate, lead stearate, strontium palmitate and the like.

The examples given hereinafter illustrate the preferred process of the present invention, but many variations on the procedure may be made without departing from the spirit and scope of this invention. In general, fatty acid amides containing carbon chains of 15 or more carbon atoms yield the best water repellent effects on treated fabrics. However, in some cases those products containing carbon chains of less than 15 but more than 9 carbon atoms are very satisfactory and yield highly water repellent effects.

The following examples are given to illustrate the process of the present invention. All proportions are in parts by weight.

Example 1

A 50% solution of methoxymethylmelamine in methanol was prepared as follows:

62 parts of melamine were mixed with 240 parts of aqueous formaldehyde containing 37% formaldehyde by weight. The mixture was heated to 62° C. and kept at this temperature for ½ hour with continuous agitation.

Most of the water was removed from the reaction mixture under vacuum and then 100 parts of absolute methanol was added. A mixture of water and methanol was distilled off, while the volume of the reaction mixture was kept constant by further additions of absolute methanol.

After 1600 parts of distillate had been withdrawn from the mixture the methanol distilled over water-free.

The distillation was continued to concentrate the formed hexamethoxymethylmelamine solution until it contained 50% solids.

47 parts of stearamide were mixed with 27.5 parts of a methanol solution containing 50% of methoxymethylmelamine and prepared as described above. The ingredients were heated together to form a reaction product but the reaction was stopped before the material became insoluble and infusible. This product was then mixed with 7½ parts of paraformaldehyde, 7.6 parts of phosphorus trichloride, 10 parts of mineral spirits and 30 parts of dioxan. The mixture was heated at 70° C. for 3 hours, then 17.5 parts of pyridine were added. When used to impregnate a sample of olive drab dyed poplin and the cloth dried at a low temperature and baked at 160° C. for 3 minutes, an initial spray rating of 100 was secured, which was reduced to about 85 after three standard dry cleanings.

Example 2

A 44% solution of ethoxymethylmelamine in ethanol was prepared by heating a mixture of 126 parts of melamine with 480 parts of 37% aqueous formaldehyde. The temperature was raised to 62° C. and the mixture was kept at this temperature for ½ hour.

200 parts of anhydrous ethanol were added and the water was removed from the mixture by azeotropic distillation. The level of the reaction mixture was kept constant by adding ethanol to compensate for the distillate.

After 2000 parts of distillate had been withdrawn in this manner the ethanol distilled over water-free.

The distillation was continued until the hexaethoxymethylmelamine solution contained 44% solids.

3.7 parts of ethoxymethylmelamine solution containing 44% of solids and prepared as described above was mixed with 5.7 parts of stearamide and 1 part of dioxan. The mixture was heated under a reflux condenser to boiling on a water bath for several hours. Then was added to the above reaction product a suspension formed by passing .37 part of anhydrous hydrogen chloride into an .8 part of pyridine dissolved in one part of benzene. The mixture of the melamine reaction product with the pyridine hydrochloride was heated to about 60°-70° C. for 30 minutes. After this time a waxy material was secured which was readily dispersible in water. 5 parts of the above water repellent material was dissolved in 93 parts of water containing 2 parts of sodium acetate trihydrate. A swatch of OD poplin was padded with this solution and then baked at 160° C. for 3 minutes after squeezing and drying. An initial spray rating of 100 was secured, which was reduced to 70 after 3 dry cleanings.

Example 3

3.7 parts of ethoxymethyl melamine solution in ethanol containing 44% of solids as described in Example 2 was mixed with 2.8 parts of stearamide and 1 part of dioxan. The solution was heated under a reflux condenser at boiling for several hours. It was then cooled and 2.34 parts of pyridine hydrochloride suspended in 2 parts of benzene were added and the mixture heated to 60°-70° C. for 30 minutes. A water dispersible, waxy material was obtained. On applying this material from a 6% solution in water to OD poplin, an initial spray rating of 100 was secured, which was reduced to 75 after 3 dry cleanings.

Example 4

30 parts of dimethylol urea was mixed with 170 parts of n-butanol and 2 parts of phosphoric acid. The mixture was boiled and water was continuously distilled off. The excess butanol was then removed under a vacuum to yield a solution of 42.5% solids. 4 parts of this solution were mixed with 5.7 parts of stearamide and 1 part of dioxan. The solution was heated for a short time to obtain a reaction product and then 2.34 parts of pyridine hydrochloride suspended in 2 parts of benzene were added and heated continuously at 60° C. for a short time. A waxy material which was soluble in water was obtained.

Example 5

4.3 parts of stearamide were mixed with 3.7 parts of ethoxymethyl melamine solution in ethanol containing 44% solids prepared as in Example 2, and 1 part of dioxan was added. The solution was heated under a reflux condenser at boiling for several hours and then 1.17 parts of pyridine hydrochloride suspended in 1 part of benzene was added and heated continuously for 30 minutes at 60° C. This material was readily soluble in water and when applied to OD poplin from a 6% solution, gave an initial spray rating of 90.

Example 6

74 parts of ethoxymethyl melamine solution in ethanol containing 44 parts of solids prepared as in Example 2 was mixed with 114 parts of stearamide. The solution was heated for 1¼ hours at a temperature of 95°–105° C., during which time the solution lost 14 parts in weight. 16 parts of pyridine, 10 parts of "Varsol" and 31 parts of ethyl acetate were added and the material heated to 70°–80° C. 9.3 parts of phosphorus trichloride were added slowly to produce a readily dispersible, hard, waxy material.

Example 7

74 parts of ethoxymethyl melamine solution in ethanol containing 44% solids prepared as in Example 2 was heated with 114 parts of stearamide for 1¼ hours at 95° C. 24 parts of pyridine, 10 parts of "Varsol" and 17 parts of ethyl acetate were then added. The batch was divided into two parts, to one was added slowly with rapid stirring 4.7 parts of phosphorus trichloride and the temperature maintained at 70°–80° C. for 30 minutes. The other half of the batch was treated with 9.2 parts of phosphorus trichloride and an additional 12 parts of pyridine. Both materials were readily soluble in water.

Example 8

37 parts of ethoxymethyl melamine solution in ethanol containing 44 parts of solids prepared as in Example 2 was heated with 37 parts of stearamide for 1¼ hours at 95° C. There was then added 14 parts of beta-gamma picoline, 5 parts of "Varsol" and 8.5 parts of ethyl acetate. The temperature was adjusted to 70° C. and 4.7 parts of phosphorus trichloride were added slowly so as to maintain the temperature below 80° C. for 30 minutes. A pasty material was secured which was readily dispersible in water.

Example 9

42 parts of melamine, 188 parts of stearamide and 160 parts of 37% aqueous formaldehyde were mixed with 500 parts of absolute ethanol. This mixture was heated under reflux at 80° C. for ½ hour with continuous agitation.

The ethanol-water mixture was then distilled off and fresh ethanol was added to the reaction mixture in order to keep the volume constant.

After 1250 parts of distillate had been collected the ethanol distilled over water-free. The distillation was then continued to concentrate the reaction product. The final product was a white wax-like material containing 53% solids.

60 parts of intermediate formed above were mixed with 5.1 parts beta-gamma picoline and heated to 70° C.

To this material 1.7 parts of phosphorus trichloride were added slowly, while the temperature was kept below 80° C.

A tan wax-like material was secured, which was readily dispersible in water.

The above examples illustrate the use of melamine and methoxymethyl melamine; as well as butoxymethyl urea, to produce the desired amide reaction products. However, I may also use other alkoxy derivatives such as isopropoxymethyl melamine, ethoxymethyl guanidine, methoxymethyl dicyanodiamide, methoxymethyl guanyl urea, and the like. Furthermore, as well as stearamide and the like, certain reaction products of amines with fatty acids can be used, such as the substituted amides derived by reacting fatty acids of more than 9 carbon atoms with ethylene diamine, diethylene triamine, diamino propane and the like.

I claim:

1. A water-dispersible chemical product adapted for treating textiles to impart a water-repellent effect thereto which is stable to dry cleaning, comprising a quaternary ammonium compound formed by heating: (A) a tertiary amine, (B) an inorganic halogen compound selected from the group consisting of hydrogen chloride, hydrogen bromide, phosphorus trichloride, phosphorus oxychloride, phosphorus pentachloride, thionyl chloride and sulfuryl chloride, and (C) a preformed condensation product of (a) a fatty acid amide containing more than 9 carbon atoms and (b) a nitrogenous compound containing a plurality of alkoxymethyl radicals each of which is attached to a nitrogen atom and selected from the group consistsing of N-alkoxymethyl derivatives of urea and melamine containing no more than 5 carbon atoms in each alkoxy group, the condensation product being a soluble material obtained by heating said amide and said nitrogenous compound at refluxing temperature in an alcohol containing no more than 5 carbon atoms until at least one but not all of the alkoxy groups of the N-alkoxymethyl radicals have been replaced by acylamido groups from said fatty acid amide.

2. The product of claim 1, wherein the nitrogenous compound containing N-alkoxymethyl radicals is hexaethoxymethylmelamine.

3. The product of claim 1, wherein the nitrogenous compound containing N-alkoxymethyl radicals is dibutoxymethylurea.

4. A water-dispersible chemical product adapted for treating textiles to impart a water-repellent effect thereto which is stable to dry cleaning, comprising a quaternary ammonium compound formed by heating: (A) a tertiary amine, (B) an inorganic halogen compound selected from the group consisting of hydrogen chloride, hydrogen bromide, phosphorus trichloride, phosphorus oxychloride, phosphorus pentachloride, thionyl chloride and sulfuryl chloride, and (C) a preformed condensation product of stearamide and a nitrogenous compound containing a plurality of alkoxymethyl radicals each of which is attached to a nitrogen atom and selected from the group consisting of N-alkoxymethyl derivatives of urea and melamine containing no more than 5 carbon atoms in each alkoxy group, the condensation product being a soluble material obtained by heating said amide and said nitrogenous compound at refluxing temperature in an alcohol containing no more than 5 carbon atoms until at least one but not all of the alkoxy groups of the N-alkoxymethyl radicals have been replaced by stearamido groups.

5. A water-dispersible chemical product adapted for treating textiles to impart a water-repellent effect thereto which is stable to dry cleaning, comprising, a quaternary ammonium compound formed by heating pyridine, hydrogen chloride and a preformed condensation product of (a) a fatty acid amide containing more than 9 carbon atoms and (b) a nitrogenous compound containing a plurality of alkoxymethyl radicals each of which is attached to a nitrogen atom and selected from the group consisting of N-alkoxymethyl derivatives of urea and melamine containing no more than 5 carbon atoms in each alkoxy group, the condensation product being a soluble material obtained by heating said amide and said nitrogenous compound at refluxing temperature in an alcohol containing no more than 5 carbon atoms until at least one but not all of the alkoxy groups of the N-alkoxymethyl radicals have been replaced by acylamido groups from said fatty acid amide.

6. A water-dispersible chemical product adapted for treating textiles to impart a water-repellent effect thereto which is stable to dry cleaning, comprising a quaternary ammonium compound formed by heating pyridine, hydrogen chloride and a preformed condensation product of stearamide and an N-alkoxymethyl derivative of melamine containing a plurality of N-alkoxymethyl radicals and no more than 5 carbon atoms per alkoxy group, the condensation product being a soluble material obtained by heating said amide and said melamine compound at refluxing temperature in an alcohol containing no more than 5 carbon atoms until at least one but not all of the alkoxy groups of the N-alkoxymethyl radicals have been replaced by stearamido groups.

7. A water-dispersible chemical product adapted for treating textiles to impart a water-repellent effect thereto which is stable to dry cleaning, comprising a quaternary ammonium compound formed by heating pyridine, hydrogen chloride and a preformed condensation product of stearamide and an N-alkoxymethyl derivative of urea containing a plurality of N-alkoxymethyl radicals and no more than 5 carbon atoms per alkoxy group, the condensation product being a soluble material obtained by heating said amide and said urea compound at refluxing temperature in an alcohol containing no more than 5 carbon atoms until at least one but not all of the alkoxy groups of the N-alkoxymethyl radicals have been replaced by stearamido groups.

8. The process which comprises heating, at refluxing temperature in an alcohol containing no more than 5 carbon atoms, a solution of a nitrogenous compound containing a plurality of alkoxymethyl radicals each of which is attached to a nitrogen atom and selected from the group consisting of N-alkoxymethyl derivatives of urea and melamine containing no more than 5 carbon atoms in each alkoxy group, with a fatty acid amide containing more than 9 carbon atoms, to replace at least one of the alkoxy groups of the alkoxymethyl radicals by acylamido groups, and then heating the thus-obtained product with a tertiary amine and an inorganic halogen compound selected from the group consisting of hydrogen chloride, hydrogen bromide, phosphorus trichloride, phosphorus oxychloride, phosphorus pentachloride, thionyl chloride and sulfuryl chloride, to replace at least one of the alkoxy groups by quaternary ammonium halide groups, whereby a water-dispersible reaction product is obtained which is capable, on application to textiles and heating thereon, of conferring a dry cleaning-resistant water-repellent effect thereto.

9. The process which comprises heating, at refluxing temperature in an alcohol containing no more than 5 carbon atoms, a solution of an N-alkoxymethyl derivative of melamine, containing a plurality of N-alkoxymethyl radicals and no more than 5 carbon atoms per alkoxy group, with a fatty acid amide containing more than 9 carbon atoms, to replace at least one of the alkoxy groups of the alkoxymethyl radicals by acylamido groups, and then heating the thus obtained product with a tertiary amine and an inorganic halogen compound selected from the group consisting of hydrogen chloride, hydrogen bromide, phosphorus trichloride, phosphorus oxychloride, phosphorus pentachloride, thionyl chloride and sulfuryl chloride, to replace at least one of the alkoxy groups by quaternary ammonium halide groups, whereby a water-dispersible reaction product is obtained which is capable, on application to textiles and heating thereon, of conferring a dry cleaning-resistant water-repellent effect thereto.

10. The process which comprises heating, at refluxing temperature in an alcohol containing no more than 5 carbon atoms, a solution of an N-alkoxymethyl derivative of urea, containing a plurality of N-alkoxymethyl radicals and no more than 5 carbon atoms per alkoxy group, with a fatty acid amide containing more than 9 carbon atoms, to replace at least one of the alkoxy groups of the alkoxymethyl radicals by acylamido groups, and then heating the thus-obtained product with a tertiary amine and an inorganic halogen compound selected from the group consisting of hydrogen chloride, hydrogen bromide, phosphorus trichloride, phosphorus oxychloride, phosphorus pentachloride, thionyl chloride and sulfuryl chloride, to replace at least one of the alkoxy groups by quaternary ammonium halide groups, whereby a water-dispersible reaction product is obtained which is capable, on application to textiles and heating thereon, of conferring a dry cleaning-resistant water-repellent effect thereto.

JOHN B. RUST.

REFERENCES CITED

The following references are of record in the file of this patent:

UNITED STATES PATENTS

| Number | Name | Date |
|---|---|---|
| 2,165,265 | Hubert | July 11, 1939 |
| 2,344,934 | West | Mar. 21, 1944 |
| 2,357,273 | Thurston | Aug. 29, 1944 |
| 2,374,259 | Albrecht | Apr. 24, 1945 |
| 2,377,867 | D'Alelio | June 12, 1945 |
| 2,420,157 | West | May 6, 1947 |
| 2,433,802 | West | Dec. 30, 1947 |